(12) United States Patent
Foster et al.

(10) Patent No.: US 10,085,317 B2
(45) Date of Patent: Sep. 25, 2018

(54) CONTROL SYSTEM FOR LIGHTING DEVICES

(71) Applicant: Ephesus Lighting, Inc., Syracuse, NY (US)

(72) Inventors: Daniel S. Foster, Syracuse, NY (US); Joseph R. Casper, Syracuse, NY (US); Christopher D. Nolan, Syracuse, NY (US); Benjamin David Vollmer, Syracuse, NY (US); Alexander Orisyuk, Syracuse, NY (US); George Albert Dederich, Syracuse, NY (US)

(73) Assignee: Cooper Lighting, LLC, Cleveland, OH (US)

( * ) Notice: Subject to any disclaimer, the term of this patent is extended or adjusted under 35 U.S.C. 154(b) by 0 days.

(21) Appl. No.: 15/720,325

(22) Filed: Sep. 29, 2017

(65) Prior Publication Data

US 2018/0035505 A1    Feb. 1, 2018

Related U.S. Application Data

(63) Continuation-in-part of application No. 15/453,343, filed on Mar. 8, 2017, now Pat. No. 9,800,431.
(Continued)

(51) Int. Cl.
*H05B 33/00* (2006.01)
*H05B 33/08* (2006.01)
(Continued)

(52) U.S. Cl.
CPC ..... *H05B 33/0845* (2013.01); *H05B 33/0854* (2013.01); *H05B 37/0218* (2013.01);
(Continued)

(58) Field of Classification Search
CPC .. H04J 3/00; H04J 3/1694; H04J 14/08; H04J 14/028; H04J 14/0282; H04J 14/0283;
(Continued)

(56) References Cited

U.S. PATENT DOCUMENTS

| 3,899,787 A | 8/1975 | Czerwinski |
| 7,202,613 B2 | 4/2007 | Morgan et al. |

(Continued)

FOREIGN PATENT DOCUMENTS

WO    2007094795 A2    8/2007

*Primary Examiner* — Monica C King
(74) *Attorney, Agent, or Firm* — Fox Rothschild LLP

(57) ABSTRACT

A system of networked lighting devices includes a central controller and a group of lighting devices. The central controller includes a processor, first and second communication interfaces, various lighting devices and a communication link. The first communication interface includes input ports and a multiplexer configured to receive signals from the input ports and combine the received signals into a multiplexed signal. The second communication interface includes one or more antennas and is configured to receive the multiplexed signal from the multiplexer and transmit the multiplexed signal via the antenna(s). Each lighting device includes a fixture controller, one or more lighting modules, and a communication interface. The communication link transmits the multiplexed signal between one or more of the lighting devices and at least one of the communication interfaces of the central controller.

18 Claims, 10 Drawing Sheets

Related U.S. Application Data

(60) Provisional application No. 62/304,998, filed on Mar. 8, 2016, provisional application No. 62/395,520, filed on Sep. 16, 2016.

(51) Int. Cl.
  *H05B 37/03* (2006.01)
  *H05B 37/02* (2006.01)
  *H04L 29/08* (2006.01)
  *F21Y 115/10* (2016.01)
  *F21S 2/00* (2016.01)
  *F21V 23/02* (2006.01)
  *F21V 21/30* (2006.01)
  *F21V 29/75* (2015.01)

(52) U.S. Cl.
  CPC ......... *H05B 37/0272* (2013.01); *H05B 37/03* (2013.01); *F21S 2/005* (2013.01); *F21V 21/30* (2013.01); *F21V 23/02* (2013.01); *F21V 29/75* (2015.01); *F21Y 2115/10* (2016.08); *H04L 67/12* (2013.01)

(58) Field of Classification Search
  CPC . H04J 14/0286; H04W 52/225; H04W 4/025; H04W 28/06; H04W 4/028; H04W 84/047; H05B 1/0252; H05B 6/668; H05B 6/68
  See application file for complete search history.

(56) References Cited

U.S. PATENT DOCUMENTS

| | | |
|---|---|---|
| 7,550,931 B2 | 6/2009 | Lys et al. |
| 9,188,307 B2 | 11/2015 | Casper et al. |
| 9,189,996 B2 | 11/2015 | Casper et al. |
| 9,462,425 B2 | 10/2016 | Tong et al. |
| 9,537,515 B2 | 1/2017 | Deyle |
| 9,559,433 B2 | 1/2017 | Zhou et al. |
| 9,648,586 B2 | 5/2017 | Han et al. |
| 9,713,155 B2 | 7/2017 | Negus |
| 2006/0273741 A1 | 12/2006 | Stalker |
| 2007/0237284 A1 | 10/2007 | Lys et al. |
| 2014/0189080 A1 | 7/2014 | Dixon et al. |
| 2015/0278137 A1 | 10/2015 | Gan et al. |
| 2016/0353552 A1 | 12/2016 | Snyder et al. |

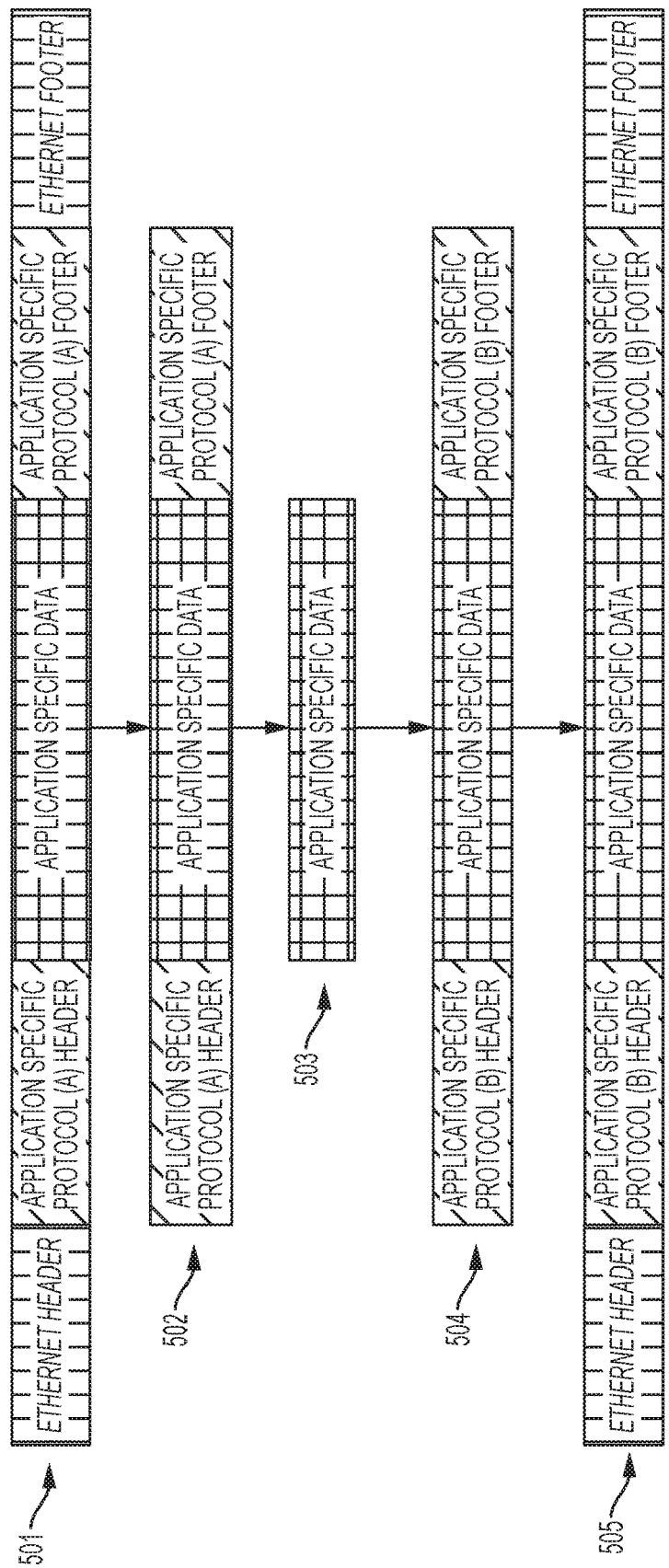

CONTROL SYSTEM FOR LIGHTING DEVICES

BACKGROUND

This patent application is a continuation-in-part of U.S. patent application Ser. No. 15/453,343, filed Mar. 8, 2017, which in turn claims priority to: (1) U.S. Provisional Patent Application No. 62/304,998, filed Mar. 8, 2016, titled "Router Topology for Communication and Control in a System of Illumination Devices;" and (2) U.S. Provisional Patent Application No. 62/395,520, filed Sep. 16, 2016, titled "Controllers for Interconnected Lighting Devices." The disclosures of the priority applications listed above are fully incorporated into this document by reference.

BACKGROUND

Lighting systems that include many luminaires that are controlled by one or more central controllers are available in a wide variety of configurations. Many different controllers are also available. Often, different lighting and control devices from different manufacturers (or even from the same manufacturer) may use different communication standards, and they may receive commands from different systems using different communication protocols. Thus, when replacing or upgrading a system, a lighting system owner must either change the whole system or return to the original manufacturer (or a compatible source) for replacement components in order for a central controller to be able to communicate with all lighting devices in the system. This limits customers' options for upgrading existing lighting systems.

This disclosure describes methods and systems that are directed to improving the ability to use disparate types of lighting devices in commonly controlled system, and/or using various types of controllers to control various lighting devices.

SUMMARY

In some aspects, a central controller includes a processor, first and second communication interfaces, various lighting devices and a communication link. The first communication interface includes input ports and a multiplexer configured to receive signals from the input ports and combine the received signals into a multiplexed signal. The second communication interface includes one or more antennas and is configured to receive the multiplexed signal from the multiplexer and transmit the multiplexed signal via the one or more antennas. Each of the lighting devices includes a fixture controller, one or more lighting modules, and a communication interface. The communication link transmits the multiplexed signal between one or more of the lighting devices and at least one of the communication interfaces of the central controller.

Optionally, the communication link includes various serial communication links, each of which connects a communication interface of one of the lighting devices to either: (a) a communication interface of another one of the lighting devices; or (b) one of the communication interfaces of the central controller, to provide for transfer of the multiplexed signal between the lighting devices and the central controller.

Optionally, at least one of the lighting devices may include a memory with programming instructions that are configured to cause the fixture controller of that lighting device to: (i) upon receipt of the multiplexed signal from the central controller, examine the multiplexed signal to identify one or more destination lighting devices to which a command in the multiplexed signal was directed; and (ii) if the identified one or more destination lighting devices include the lighting device of which the fixture controller is a component, cause the lighting module of that lighting device (i.e., the lighting device of which the fixture controller is a component) to take an action according to the command.

Optionally, the second communication interface may include a set of antennas, and the central controller may include a switch for selectively directing the multiplexed signal from the multiplexer to one of the antennas.

Optionally, the communication link may be communicatively connected to the second communication interface of the central controller to send commands from the central controller to the lighting devices, and the first communication interface of the central controller may be communicatively connected to one or more remote controllers. Alternatively, the communication link may be communicatively connected to the first communication interface of the central controller so that the central controller receives data from the lighting devices and the second communication interface of the central controller may be communicatively connected to one or more remote systems.

Optionally, the central controller includes a memory device that stores programming instructions that are configured to, for any received signal that is encoded according to a first communication protocol that is not compatible with a communication protocol of the lighting devices: (i) translate a command in the signal from the first communication protocol into a second communication protocol that is compatible with the communication protocol of the lighting devices; and (ii) cause the translated command to be transmitted to one or more of the lighting devices.

Optionally, the central controller and the lighting devices may be communicatively connected in a ring topology, and each of the lighting devices may include or be communicatively connected to a router. If so, the central controller may be configured to, upon detecting a failure in a lighting device or communication link of the ring topology, identify a location of the failure and direct future commands to selected lighting devices in the system via the routers.

In other aspects, a lighting system may include a plurality of lighting devices and a central controller that is communicatively connected to the lighting devices. The central controller may include a processor, a first communication interface, and a memory device. The memory device may contain programming instructions that are configured to cause the processor to: (i) receive one or more command signals via the first communication interface, wherein the one or more command signals comprise a command that is directed for one or more of the lighting devices, and the command is encoded according to a first communication protocol that is not compatible with the one or more lighting devices for which the command is directed; (ii) translate the command from the first communication protocol into a second communication protocol that is compatible with the one or more lighting devices for which the command is directed; and (iii) cause the translated command to be transmitted to the one or more lighting devices for which the command is directed so that the one or more lighting devices for which the command is directed will actuate in accordance with the command.

Optionally, the first communication interface may include input ports for receiving command signals, as well as a multiplexer that is configured to receive the command signals from the input ports and combine the command signals into a multiplexed signal. The controller also may include a second communication interface comprising one or more one or more antennas configured to receive the multiplexed signal and transmit the multiplexed signal to the one or more lighting devices via the one or more antennas. The controller also may include a switch for selectively directing the multiplexed signal from the multiplexer to one of the plurality of antennas.

Optionally, at least one of the lighting devices may include a fixture controller, one or more lighting modules, a communication interface, and a memory. The memory may contain programming instructions that are configured to cause the fixture controller to: (i) upon receipt of a translated command from the controller device, examine the command to identify one or more destination lighting devices to which the command was directed; and (ii) if the identified one or more destination devices include the lighting device of which the fixture controller is a component, cause the lighting module of the lighting device of which the fixture controller is a component to take an action according to the command.

Optionally, the central controller and the lighting devices may be communicatively connected in a ring topology. In addition, each of the lighting devices may include, or may communicatively connected to a router. If so, the central controller may be configured to, upon detection of a failure in a lighting device or communication link of the ring topology: (i) identify a location of the failure; and (ii) direct future commands to selected lighting devices in the system via the routers.

In some aspects, in a method of controlling a system of lighting devices, a central controller is communicatively connected to a group of lighting devices. The central controller receives one or more command signals via the first communication interface, wherein the one or more command signals comprise a command that is directed for one or more of the lighting devices, and the command is encoded according to a first communication protocol that is not compatible with the one or more lighting devices for which the command is directed. The command is translate from the first communication protocol into a second communication protocol that is compatible with the one or more lighting devices for which the command is directed. The translated command is transmitted to the one or more lighting devices for which the command is directed so that the one or more lighting devices for which the command is directed will actuate in accordance with the command. If multiple command signals are present, the central controller, may combine the command signals into a multiplexed signal before causing the translated command to be transmitted to the one or more lighting devices for which the command is directed.

Optionally, at least one of the lighting devices may include a fixture controller, one or more lighting modules, and a communication interface. If so, then the fixture controller of at least one of the lighting devices may, upon receipt of a translated command from the central controller, examine the translated command to identify one or more destination lighting devices to which the translated command was directed. If the identified destination device(s) include the lighting device of which the fixture controller is a component, the fixture controller may cause the lighting module of the lighting device to take an action according to the command. If the identified destination device(s) do not include the lighting device of which the fixture controller is a component, the fixture controller may ignore the command or pass the command on to one or more other of the lighting devices.

BRIEF DESCRIPTION OF THE DRAWINGS

FIG. 5 illustrates a process of how the central controller may translate data from a standard Ethernet protocol to a proprietary Ethernet protocol that is compatible with the lighting devices.

DETAILED DESCRIPTION

Figure 1:
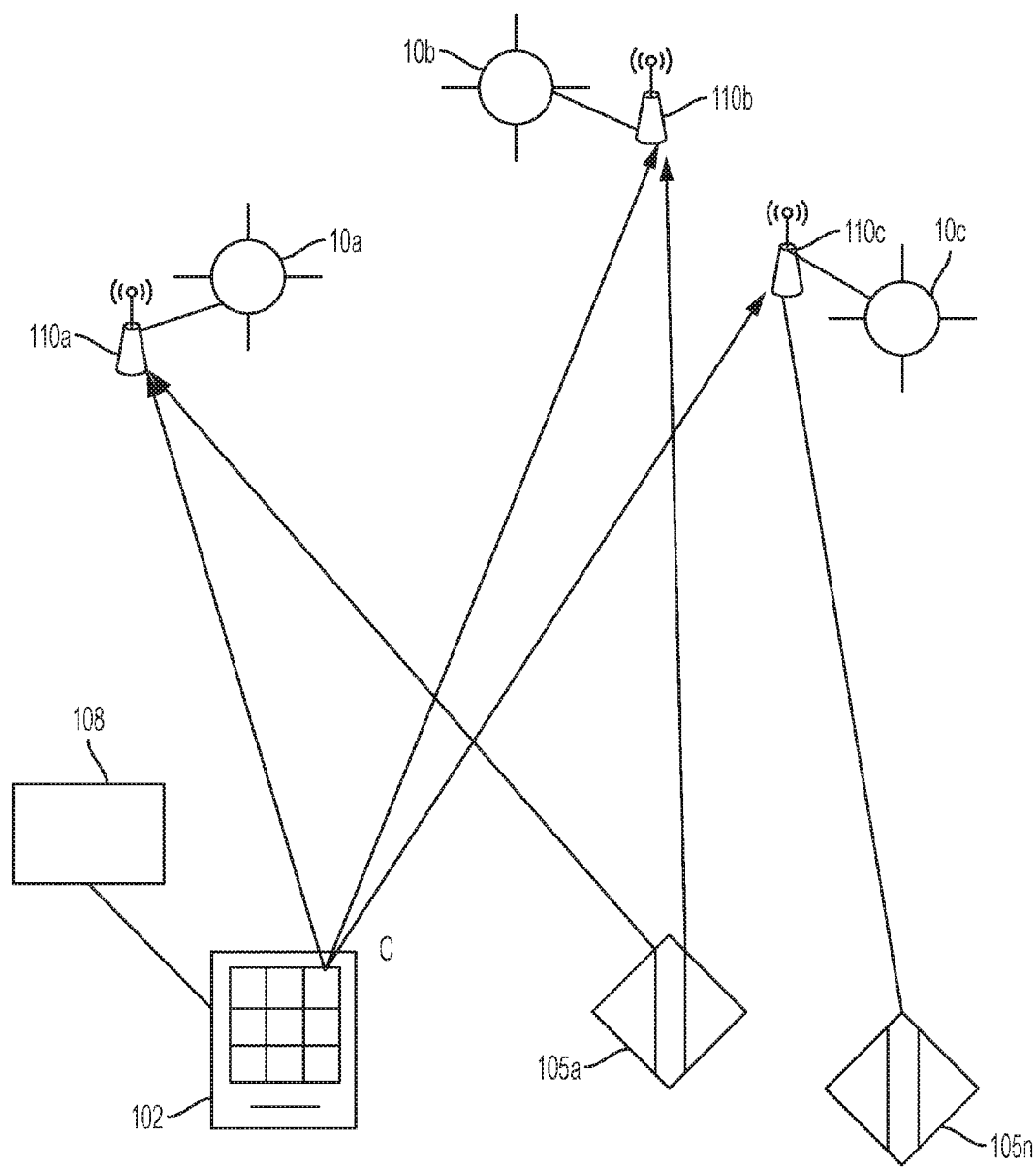
FIG. 1 illustrates an example of a network of lighting devices, with fixture controllers and a central controller used to control the light emitted by the network of devices.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, the terms "lighting device," "light fixture," "luminaire" and "illumination device" are used interchangeably to refer to a device that includes a source of optical radiation such as one or more light emitting diodes (LEDs), light bulbs, ultraviolet light or infrared sources, or other sources of optical radiation. In the embodiments disclosed in this document, the optical radiation emitted by the lighting devices includes visible light. A lighting device will also include a housing, one or more electrical components for conveying power from a power supply to the device's optical radiation source, and optionally control circuitry.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices In this document, the terms "controller" and "controller device" mean an electronic device or system of devices configured to command or otherwise manage the operation of one or more other devices. For example, a fixture controller is a controller configured to manage the operation of one or more light fixtures to which the fixture controller is communicatively linked. A controller will typically include a processing device, and it will also include or have access to a memory device that contains programming instructions configured to cause the controller's processor to manage operation of the connected device or devices.

In this document, the terms "memory" and "memory device" each refer to a non-transitory device on which computer-readable data, programming instructions or both are stored. Except where specifically stated otherwise, the terms "memory" and "memory device" are intended to include single-device embodiments, embodiments in which multiple memory devices together or collectively store a set of data or instructions, as well as one or more individual sectors within such devices.

In this document, the terms "processor" and "processing device" refer to a hardware component of an electronic device (such as a controller) that is configured to execute programming instructions. Except where specifically stated otherwise, the singular term "processor" or "processing device" is intended to include both single processing device embodiments and embodiments in which multiple processing devices together or collectively perform a process.

A "computing device" or "electronic device" refers to an electronic device having a processor, as well as memory and/or a communication device that can access a memory device. A communication device of an electronic device may include, for example, a short range wireless communication interface such as a transmitter, a near field communication (NFC) or radio frequency identifier (RFID) tag or Bluetooth™ Low Energy (BLE) receiver (with reduced transmit power), a processor and non-transitory, computer-readable memory. The memory will contain or receive programming instructions that, when executed by the processor, will cause the electronic device to perform one or more operations according to the programming instructions. Examples of electronic devices include personal computers, servers, mainframes, virtual machines, containers, gaming systems, televisions, and mobile electronic devices such as smartphones, wearable virtual reality devices, Internet-connected wearables such as smart watches and smart eyewear, personal digital assistants, tablet computers, laptop computers, media players and the like. Electronic devices also may include appliances and other devices that can communicate in an Internet-of-things arrangement, such as smart thermostats, home controller devices, voice-activated digital home assistants, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 9.

FIG. 1 illustrates a lighting system in which any number of lighting devices 10a, 10b, 10c are positioned at various locations in an environment, such as a wall, ceiling, mast, tower or other supporting structure in a stadium, arena, concert hall, outdoor amphitheater or other entertainment facility or other location. Each illumination device may include any number of lighting modules that include LEDs, and in various embodiments a number of LEDs sufficient to provide a high intensity LED device. Each illumination device may include or be connected to a fixture controller 110(a), 110(b), 110(c) that includes wiring and circuitry to supply power and/or control signals to one or more lights. A fixture controller may be an external device, or an integral device, that includes various components of an illumination device's control circuitry.

Each fixture controller 110(a), 110(b), 110(c) may include a receiver that receives wireless signals from one or more transmitters and a transmitter that sends any fixture related data to one or more receivers, e.g. to a central controller. To send and receive information transmitted wirelessly, the illumination devices also may include an antenna with a receiver and/or transmitter. The light fixtures and fixture controllers also may receive and/or send signals via a wired connection to and from one or more external sources. To receive or send information via a wired connection, each fixture controller may include one or more ports for receiving or sending data and/or power via a wired connection, such as an Ethernet cable. The external sources that generate and send the wired or wireless signals may be included in one or more central controller devices 102, or in one or more remote controller devices 108 that are in communication with the central controller device 102. This embodiment will be described in more detail starting in the discussion of FIG. 4 below. For the purpose of this discussion, a "central controller" or "central controller device" is a controller that is in electronic communication with more than one fixture controller via one or more communication links so that the central controller can direct the operation of multiple lighting devices. A remote controller is an additional controller that provides a central controller with commands for use in managing operation of the lighting devices.

Each central controller device 102 may include selectable user inputs, programming instructions stored on one or more non-transitory memory devices, a processor or circuitry, and a communication interface such as a communication port and/or a transmitter for transmitting command signals to the various illumination devices. For example, the user inputs may include inputs to turn certain lights in a certain zone of an environment on or off, in which case the central controller device will generate and send signals with encoded data that instruct the zone's lighting devices to turn on and off. The user inputs also may include brightness level adjustments for one or more zones and/or lights, or scenes that are designed to set various lighting devices at various brightness levels. Each user input command will cause the user interface device to send a signal that includes data indicating which illumination devices should be operated by the signal. When a fixture controller detects a signal that is intended for its illumination device, it will cause its illumination device to execute the command that corresponds to the control signal. Example commands and control technologies are described in U.S. Pat. Number 9,189,996, titled "Selectable, zone-based control for high intensity LED illumination system," issued to Casper et al., the disclosure of which is fully incorporated into this document by reference.

In addition, any number of external light sensors 105a-105n may be positioned at a location or multiple locations in an environment, such as a stadium playing field; a stage in an indoor or outdoor concert venue; or a court, floor or ice rink in an arena, to detect the intensity of light. The external light sensors may include transmitters that send status information and/or commands to any or all of the illumination device controllers and/or the interface device. For example, a particular illumination device's fixture controller 110c may be programmed to detect signals from a particular sensor 105n that is positioned in an area at which the controller's corresponding lighting device 10c directs light. The sensor 105n may sense light intensity, color temperature and/or color rendering index (CRI) in its vicinity and transmit intensity data to the device controller 110c. The fixture controller 110c may be programmed to increase the lighting device's 10c brightness if the local intensity data has a value that is less than a threshold, or it may decrease the lighting device's 10c brightness if the local intensity data has a value that is greater than a threshold. One way that the fixture controller may do this is by increasing or decreasing the frequency of "on" signals that cycle the LEDs on and off by pulse width modulation (PWM). Other ways of increasing and/or decreasing brightness are possible. Alternatively, the sensor 105n itself may include programming and electronics that cause it to send a command to the fixture controller 110c, such as an "increase brightness" command if local intensity is less than a threshold level or a "decrease brightness" command if local intensity is greater than a threshold level.

Figure 2:
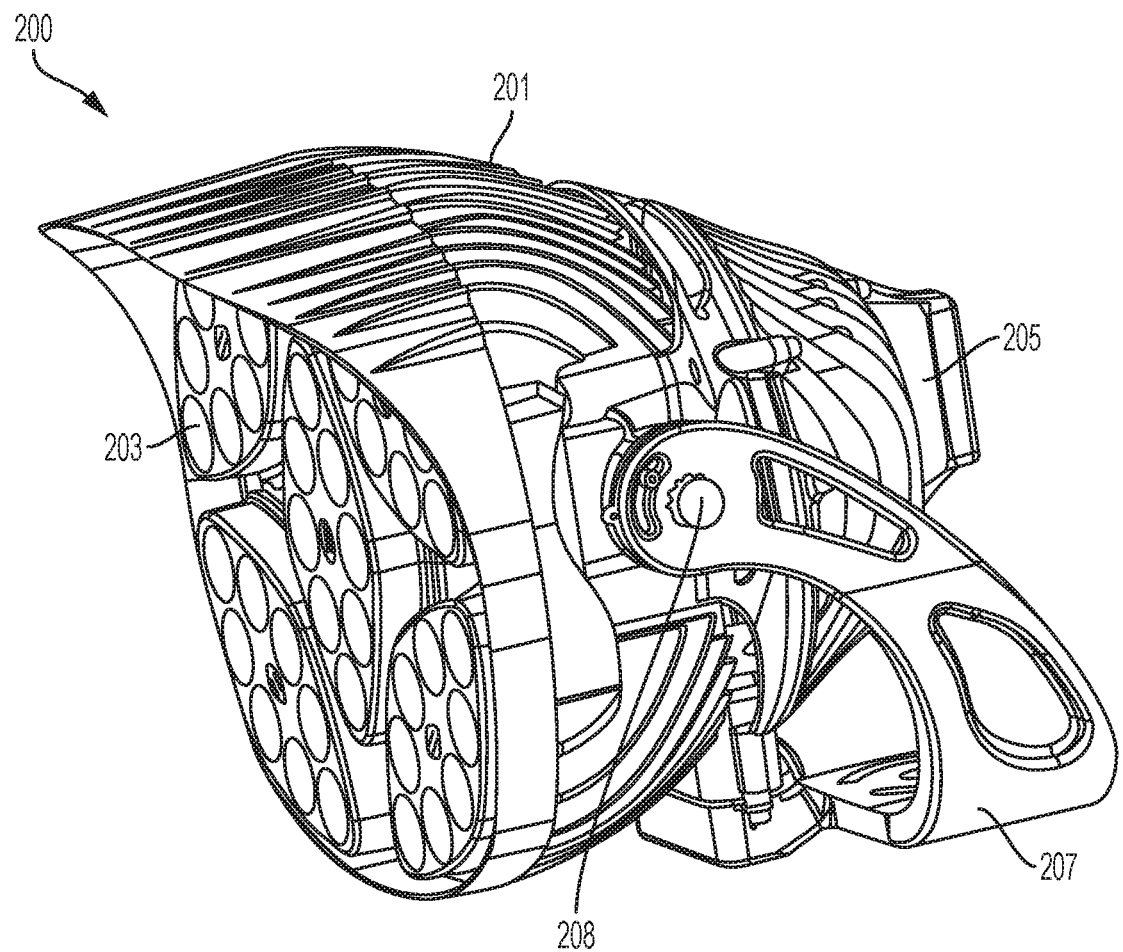
FIG. 2 illustrates an example of a lighting device that may be used with a network of lighting devices.

It is intended that the portions of this disclosure describing LED modules and control systems and methods may include various types of devices. For example, the LED modules, control systems and control methods may include those disclosed in U.S. Patent Application Publication Number No. US2014/0334149, titled "High intensity light emitting diode luminaire assembly," published Nov. 13, 2014 and filed by Nolan et al., the disclosure of which is fully incorporated into this document by reference. Another example is shown in FIG. 2. As shown in FIG. 2, the lighting device 200 includes a housing 201 that encases various components of a light fixture. The housing 201 includes an opening in which a substrate on which various LEDs are attached to form an LED module 203. Each LED module is positioned to emit light away from the fixture. Any number of LED modules, such as one, two, three, five or more may be positioned within the opening in any configuration. Various conductors and/or electronic devices, and lenses for the LEDs may be mounted on the substrate of each module.

The device's housing 201 may include a body portion that serves as a heat sink for dissipating heat that is generated by the LEDs. The body/heat sink may be formed of aluminum and/or other metal, plastic or other material, and it may include any number of fins on the exterior o increase its surface area that ill contact a surrounding cooling medium (typically, air). Thus, the body portion may have a bowl shape, the LED modules 203 may fit within the opening of the bowl, and heat from the LEDs may be drawn away from the array and dissipated via the fins on the exterior of the bowl.

While the LED modules 203 are positioned at one side of the body, the opposing side of the body may include or be connected to a power supply 205. The power supply 205 pray include a battery, solar panel, or circuitry to receive power from an external and/or other internal source. The external housing of the power supply 205 also may include fins to help dissipate heat from the power supply 205. Power wiring may be positioned within the body to direct power from the power supply 205 to the LED modules 203. The housing may be attached to a support structure, such as a base or mounting yoke 207, optionally by one or more connectors 208. As shown, the connectors may include axles about which the housing and/or support structure may be rotated to enable the lighting device to be positioned to direct light at a desired angle.

Figure 3:
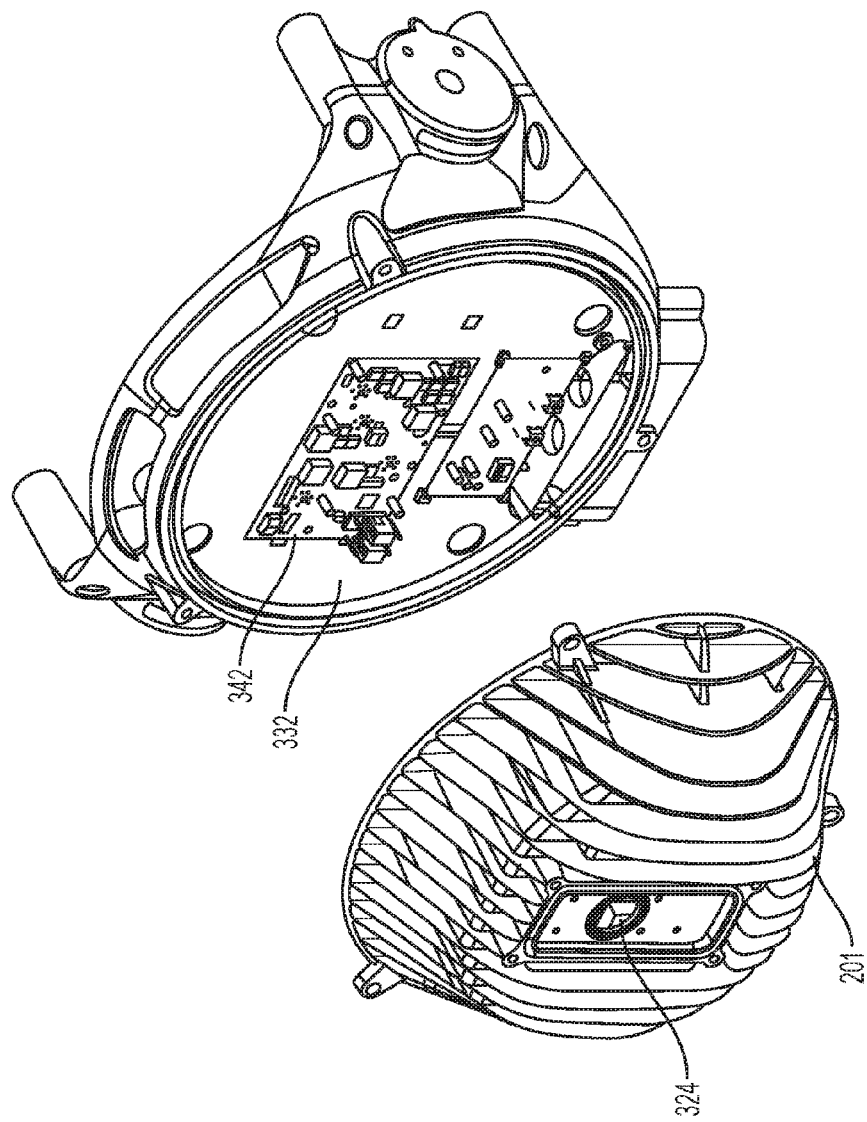
FIG. 3 is an expanded view of the lighting device of FIG. 2, with certain control components illustrated.

As shown in the exploded view of FIG. 3, a surface 332 that is positioned under the LED modules and between the LED modules and the power supply 324 may include a circuit board that includes a fixture controller 342, which may be used in the embodiments described in this document. The surface 332 may serve as an interface plate that includes one or more conductors such as wires or conductive traces for providing an electrical contact between the electrical components of the power supply 324 and the fixture controller 342. In other embodiments, the fixture controller may be positioned within or on other components of the lighting device.

Figure 4A:
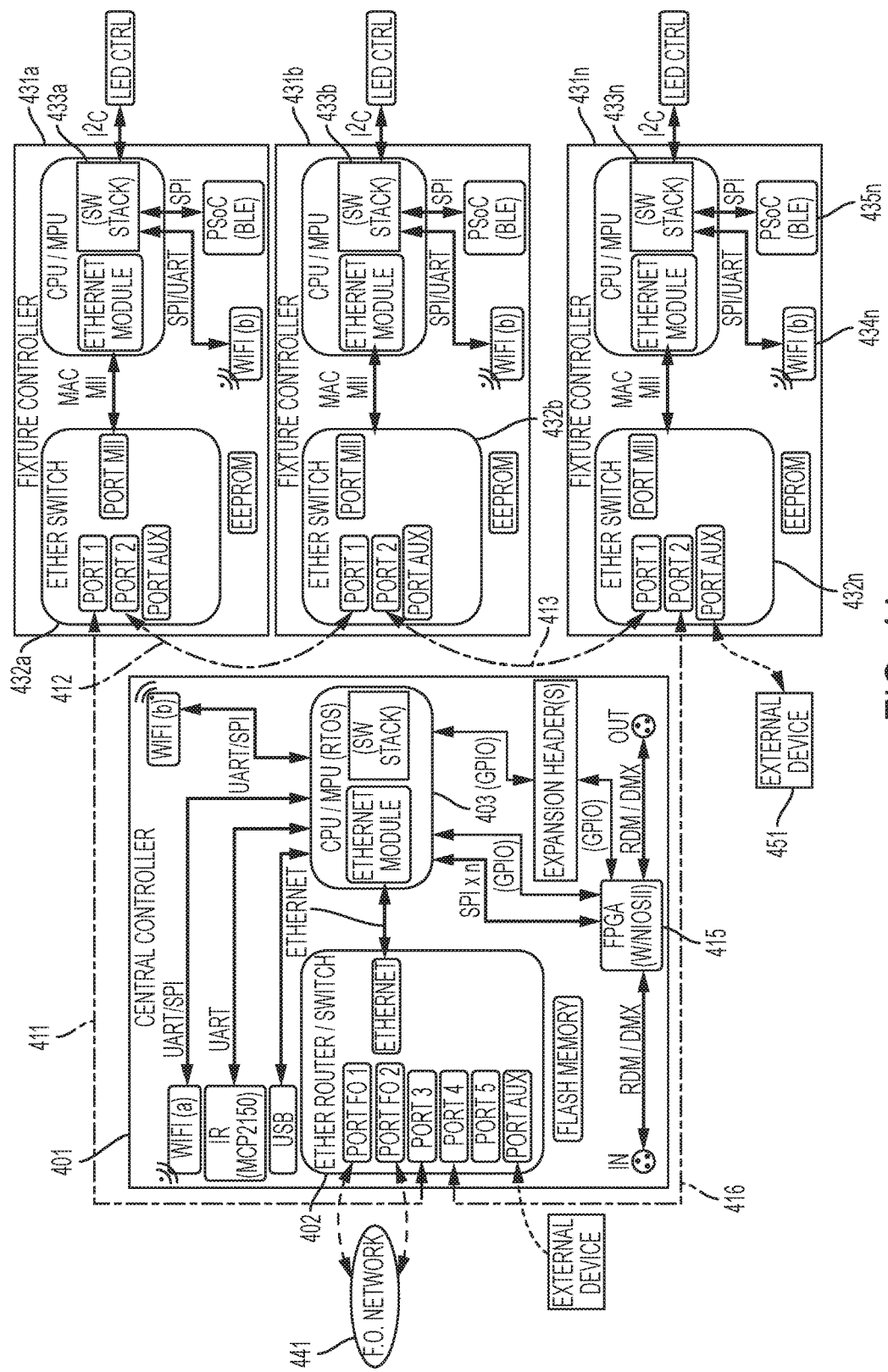
FIG. 4A illustrates an example of various components of a central controller and a set of fixture controllers, and how they may interconnect with each other to provide a network of lighting devices.

FIG. 4A illustrates an example of how a central controller 401 and multiple light fixture controllers 431a . . . 431n may transfer data and/or power signals between each other via a wired connection to form a network of lighting devices. The central controller 401 includes a processor 403 and a communications interface that includes a router or switch 402 with one or more Ethernet ports or optical fiber connectors configured to receive an Ethernet and/or fiber-optic cable. Other types of cables and connectors may be used, but for purposes of this disclosure Ethernet and fiber-optic cables and connectors will be used as examples.

Each fixture controller 431n also includes a processor 433n and, in wired connection embodiments, a switch 402n having at least two ports that are each configured to receive an Ethernet or fiber-optic cable. With the ports described above as start and end points, the central controller 401 is connected via a communication link 411, which in this case is an Ethernet or fiber-optic cable, to form a serial connection to at least one of the fixture controllers 431a. Each fixture controller (e.g., 431a) is similarly connected to at least one other fixture controller (e.g., 431b) via a serial communication link 412, 413 (in this embodiment, an Ethernet or fiber-optic cable) in a daisy chain configuration. In this way, the first fixture controller in the chain 431a is connected to the central controller 401 and a next fixture controller according to a ring topology. The next fixture controller 431b is connected to the previous fixture controller 431a and a next fixture controller in the chain until a final fixture controller 431n is reached. The final fixture controller 431n also may be connected to the central controller via a serial communication link 416 as shown in FIG. 4A.

In this way, the central controller 401 may send commands to each of the lighting device's fixture controllers via the various communication links, and the central controller 401 may receive data from each of the lighting devices' fixture controllers via the various communication links. In some embodiments, communication may be in a single direction around the loop formed by the devices and communication links; in other embodiments communication may be bidirectional in both the clockwise and counter-clockwise directions around the communication links.

In wireless embodiments, a daisy chain format may be established with each lighting device's transmitter sending data packets wirelessly with identifying data that identifies the next lighting device in the chain. In this way, a fixture controller for any particular lighting device in the chain can identify data packets that are intended for it, and the fixture controller can receive those packets and translate those packets into a communication protocol that is suitable to command the fixture controller's lighting device to implement various actions.

Any of the lighting devices (e.g., 431*n*) may be connected to one or more external devices 451, such as a camera or computing device. This connection may be via a wired connection through an Ethernet or other type of switch 432*n* as shown in FIG. 4A, or it may be a wireless connection via a wireless receiver such as a Wi-Fi receiver 434*n* or a near-field communications receiver 435*n* such as a receiver configured to receive signals via a Bluetooth™ Low Energy or other communications protocol.

Each interconnecting cable includes one or more wires used to transfer data between the networked devices. In some embodiments (such as those that include Ethernet cables or USB cables), the cables also may include one or more wires used to transfer power between the networked devices. For example, an Ethernet cable may include eight wires. In embodiments that use Ethernet cables, a pair of the wires in each cable may be used to transfer direct current (DC) between the networked devices, while some or all of the remaining pairs will be used to transfer data. USB cables may also be used to transfer data and power between the devices.

Each fixture controller 431*a* . . . 431*n* will include a power input that receives power from an external power source or battery to which the lighting device is connected. However, if the power to any lighting device fails, the fixture controller of that lighting device may switch to the DC power that is available from an external power source via the Ethernet cable or any other dedicated transmission medium. Each fixture controller may include a priority switch that is programmed to switch to the external power source upon detecting failure of the device's primary source of power, and to switch back to the primary source of power when the power again becomes available. In this way, backup power is made available to each lighting device's fixture controller via the device's Ethernet port (or other power delivery port), and individual devices' fixture controllers will only switch to the backup power when and if primary power is interrupted. The backup power need not be sufficient to power the entire lighting device, but instead only needs to be sufficient to power one or more devices' fixture controller(s) when power to those devices' fixture controllers is interrupted.

As noted above, the central controller 401 also may be communicatively connected to a remote controller (not shown in FIG. 4A) via a communication interface to a network such as a fiber optic network 441.

Figure 4B:
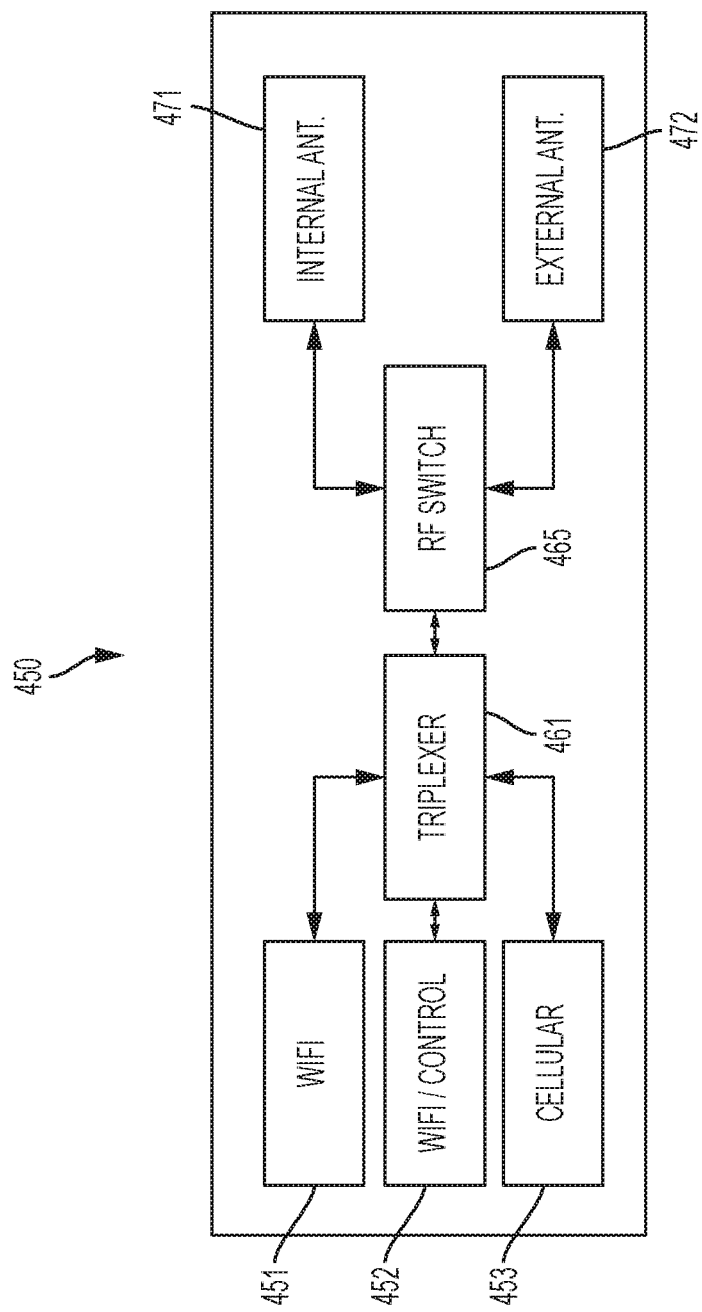
FIG. 4B illustrates a variation of the central controller of FIG. 4A.

FIG. 4B illustrates an embodiment of a central controller 450 in which a first communication interface includes multiple input data ports 451, 452, 453. The input data ports may or may not be integral with a router or switch, but in either situation they deliver received data signals to a multiplexer 461. In the example shown, multiplexer 461 is a triplexer because there are three data ports, but other types of multiplexers may be used to accommodate different numbers of input data ports in embodiments where the number of data ports is other than three. The data ports of the first communication interface may be associated with, and receive signals from different communication networks such as a 5 GHz WiFi network port 451, a 2.4 GHz WiFi network and/or a control card of a lighting device port 452, a cellular network port 453, and/or other port/network associations such as an Ethernet port. The multiplexer 461 will combine the signals by multiplexing the signals from each port into a single output data stream, which will be directed to a second communication interface that includes one or more antennas 471, 472 for transmission to external devices.

In configurations where the input data ports 451-453 receive signals from external controllers and/or lighting control cards, the output signal may be sent via an internal lighting system antenna 471 for transmission to one or more of the lighting devices in the network. In configurations where the input data ports 451-453 receive signals from the networked lighting devices (such as signals with data about lighting device state and/or data sensed by the lighting devices), the output signal may be sent via an external system antenna 473 for transmission to one or more external receivers. Optionally, the second communication interface of the central controller may be constructed for use in both configurations, with both an internal lighting system antenna 471 and an external system antenna 473, along with a radio frequency or other switch 465 that can be operated to selectively direct the signal to a selected one of the antennas.

Each lighting device will have an associated address, such as an Internet Protocol address. When sending control data to the lighting devices, the central controller may designate the data to be used by all devices, by a group of the devices, or by individual devices. As each device receives data, its fixture controller may examine the data to determine whether that data is intended for it. Alternatively, a central controller may be configured to be in a "pass-through" mode where it will forward any received data directly to lighting devices for any further processing. One way in which this may be done is that the central controller may associate one or more device addresses with each set of data. For example, the central controller may send a start data signal, one or more device addresses, and a control data set. If a device detects (based on the device address that follows the start signal) that a data set is intended for that device, it may receive and apply that data until the stop command is received. Each device will also pass the data along to the next interconnected device in the network via the Ethernet or fiber-optic cable.

Optionally, one or more of the lighting devices may add data to the data stream before passing the data stream along to a next device. For example, referring back to FIG. 4A, any lighting device 431*b* may receive data from one or more external or internal sensors, as described above. The device may append its address to the data stream, so that the data is passed through all lighting devices in the chain and the final device 431*n* in the chain will pass the data on to the central controller 401.

When an external device 451 (such as a camera) is connected to any lighting device's Ethernet switch, the external device also may have an associated address, and the central controller 401 may send data to the external device using the external device's address and the wired network described above. Similarly, the fixture controller 431*n* to which any external device 451 is attached may send data from the external device to the central controller 401 via the data stream just as it may do with any other data as described above.

Several of the communication links shown in FIG. 4A are labeled with communication protocols that may be used to transmit data across the links. Those labels are by way of example only; other communication protocols may be used with any or all of the links shown. In addition, in various embodiments, the central controller 401 may include programming configured to translate control data received from a first protocol into a second protocol that is compatible with the lighting devices to which the central controller will send commands. In this way, the central controller 401 serves as a universal protocol gateway between the lighting devices and one or more external devices or systems. For example, the central controller 401 may translate data received from the remote controller in an Ethernet protocol, and/or it may translate data received in a wireless protocol (such as Bluetooth™ Low Energy), and/or it may translate data received in a fibre channel protocol, and/or it may translate data that it receives via other protocols, into a communication protocol that is compatible with that of the illumination devices, such as $I^2C$ or that described in the American National Standards Institute ("ANSI") "Entertainment Technology—USITT DMX512-A—Asynchronous Serial Digital Data Transmission Standard for Controlling Lighting Equipment and Accessories", which is commonly referred to a DMX512 or simply DMX. This document will use the term "DMX" to refer to the DMX512 standard, and its various variations, revisions and replacements, including any future revisions or replacements that may be consistent with the processes described in this disclosure.

For example, the central controller may extract and process application specific data contained in a standard Ethernet packet into a proprietary Ethernet protocol—i.e., a non-standard protocol that is compatible with the central controller's connected lighting devices. If multiple devices in the network use different communication protocols, the central controller may also translate data returned from a first one of the devices into a protocol that can be understood by other lighting devices who need to access the data packet. The central controller may also translate received data packets into a protocol that can be understood by the remote controller. In situations that include multiplexing as shown in FIG. 4A, translation may be performed on individual input signals before multiplexing occurs, or it may be performed on the multiplexed signal (especially if all input signals require translation in order to be understood by their destination lighting devices).

By way of example, referring to FIG. 5, in which a first Ethernet protocol (e.g., a standard protocol) is referred to as "protocol (A)" and a second Ethernet protocol (e.g., a proprietary protocol) for one or more connected lighting devices is referred to as "protocol (B)", if the central controller receives a standard Ethernet packet (step 501), it may extract the payload from the packet by removing the Ethernet header and footer (which may contain destination and source addresses). The payload will include an application specific (e.g., standard Ethernet) protocol frame comprising application specific data, an application specific protocol header and footer, and a frame check sequence from the Ethernet packet (step 502). The central controller may then extract application specific data from the Ethernet frame (step 503).

Figure 6:
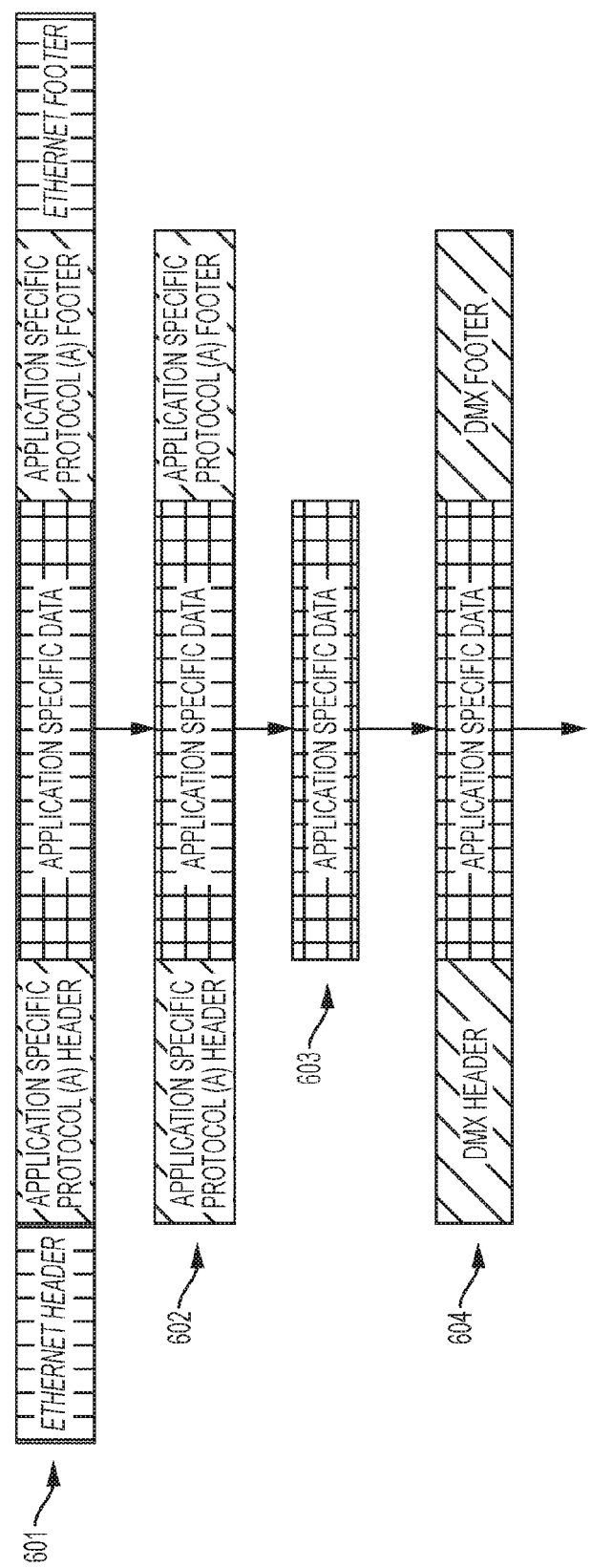
FIG. 6 illustrates a process of how a field programmable gate array may implement logic, or a processing device may serve as a protocol translation module, to translate data from a first protocol to an alternate protocol that is compatible with one or more lighting devices.

If the Ethernet packet header or footer and/or application specific protocol header or footer included a destination address indicating that the packet was intended for a particular lighting device, then the central controller may translate the application specific data into a protocol that is compatible with the lighting device and use the translated packet to command the lighting device's LED modules (see FIG. 6). Alternatively, or in addition, if the header(s) or footer(s) included a destination address that includes one or more other lighting devices in the network, the central controller may insert the application specific data (and optionally other data that the lighting device captures or generates) into a protocol B frame with a header and footer that correspond to protocol B (step 504). The central controller may then add an Ethernet packet header and footer (step 505), and it may pass this packet to the appropriate lighting device via the serial communication links.

The application specific data translation processing can be handled either by a main processor or a field programmable gate array (FPGA) of the central controller. A processor may be utilized if application specific data is to be forwarded in an Ethernet frame. Otherwise, if the data is required to be forwarded in a timing dependent protocol (e.g., DMX) then application specific data translation may occur in FPGA logic of the central controller. Referring to FIG. 6, the central controller's processor may execute programming instructions code to extract a data frame of the first protocol from the received packet (step 601), leaving the packet's header and footer behind. The processor may then extract application specific data from the frame (step 602) and forward it to FPGA logic either by a serial or a parallel interface (step 603). The FPGA will handle timing dependent communications protocol processing in its gate array logic implementation after the data is buffered within the FPGA domain, adding appropriate headers for the protocol of the lighting devices (e.g., DMX) (step 604). A protocol specific packet will be subsequently streamed out of the FPGA to a serial interface PHY module for hardware layer processing (e.g. RS-485 driver module). This process may be performed by logic implemented in a field programmable gate array (FPGA) of the central controller as described above, or in programming instructions that are implemented by a processing device that serves as a protocol translation module that performs the steps described above, including receiving an Ethernet packet 601, removing the Ethernet header and footer 602, extracting application specific data from the packet 603, and adding a DMX (or other lighting device-suitable protocol) header and footer to the extracted data to create a device-appropriate packet 604 for the lighting device(s) to which the packet will be directed.

In various embodiments, the central controller will have a memory device to collect and preserve any diagnostic system data from the central controller, from the lighting devices or from both the central controller and the lighting devices. The system may use this data for analysis after various events, such as if a drastic system failure occurs. This memory can also be used for any parameter and configuration storage purposes.

Figure 7:
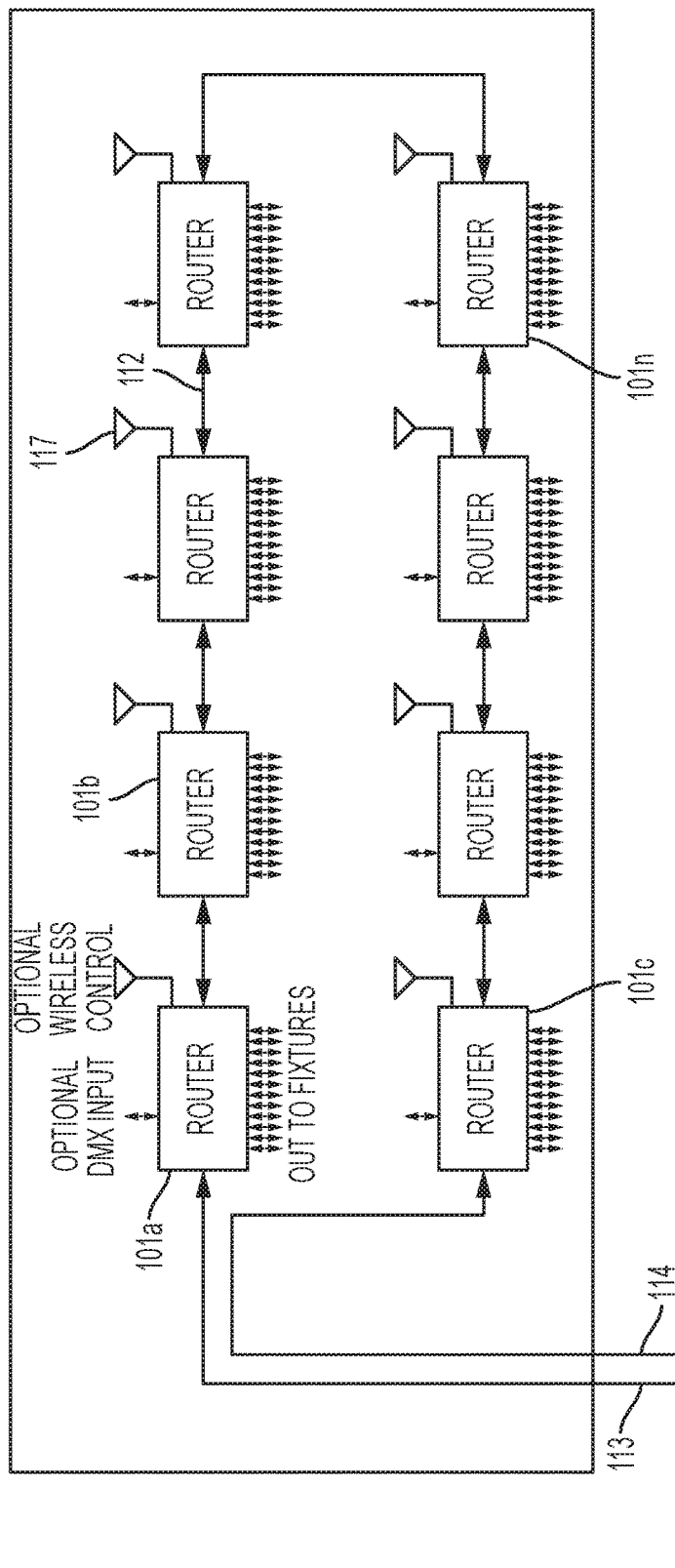
FIG. 7 illustrates a topology that uses a group of routers to communicate with a group of lighting devices.

FIG. 7 illustrates how the system may include a number of routers 101a . . . 101n that are communicatively connected between a controller device 202 (such as controller device 102 in FIG. 1) that serves as an interface device for various lighting devices or groups of lighting devices in a ring topology. The routers may be communicatively connected to each other in series to form a ring as shown via one or more wired communication paths 112, using conductors such as an Ethernet cable, a fiber optic cable, a combination of Ethernet and fiber with an Ethernet-fiber converter, or any other conductive structure that can carry signals between the interface device and the routers. In this way, rather than the lighting devices being directly connected to each other in the ring topology as in FIG. 4, the routers may be connected to each other, and each router may serve to control multiple groups of lighting devices. Optionally, each router also may include a receiver 117 for receiving control signals via a wireless communication protocol. The ring of routers are communicatively connected to the interface device 202 via a wired path such as those described above, a wireless communication system such as one or more transmitters and receivers, or a combination of wired and wireless systems. Each router 101a . . . 101n is configured to receive lighting control commands from the interface device 202 and deliver the commands it to the lighting controllers to which it is communicatively connected. Each router 101a . . . 101n is also capable of receiving telemetry data (such as data received from an external lighting sensor, or data provided by the connected lighting devices) from its corresponding lighting controllers and retuning that data to the interface device or to another monitoring system.

Each of the routers 101a . . . 101n shares with adjacent routers via the wired communication link some or all of the telemetry data that it receives from external sensors, telemetry data that it creates from monitoring its own parameters, and control signals that it receives from the interface device 202. Each of the routers 101a . . . 101n will have a unique identifying code. Each router may associate the telemetry data that it receives or generates with its unique identifying router code, so that when the data is passed through the ring back to the interface device 202, the interface device 202 can use the router code to identify the router from which the data originated. Similarly, the interface device may associate a command that is directed to a particular target router with that target router's unique router code. When the command passes through the ring to that target router, the target router can use that router code to determine that the command is intended for it, while other routers will use that router code to determine that it is not a code that the router is to implement. The system also may use group codes to identify groups or routers. A command may thus have a single code that is associated with a single router, multiple codes associated with multiple routers, or a group code associated with two or more routers.

If a failure occurs in the ring, such as a failure in a communication link between any two routers, or a failure (e.g., mechanical failure, taking offline, or other inoperability) of a router itself, the interface device 202 may still receive telemetry data and send commands to all routers by sending the signals across two communication paths 113, 114 to two routers 101a, 101c. The interface device may periodically or upon command test the integrity of the ring by sending a check signal across a first communication path 113 and waiting for the check signal to be returned via the second communication path 114. If the interface device 202 receives the check signal on the second communication path 114, it may presume that the ring is intact. If the interface device 202 does not receive the check signal on the second communication path 114, it may presume that the ring has broken. The interface device also may determine a location of the failure by inspecting the telemetry data that it receives on each path and using the telemetry data's associated router to identify the routers that are able to send data to the interface device 202 along each communication path. For example, if the interface device receives data from a first group of routers (here, router 101a) along communication path 113 and data from a second group of routers (here, routers 101b through 101n) along communication path 114, it can presume that the fault occurred in the communication link between the first and second group (in this example, between routers 101a and 101b).

Figure 8:
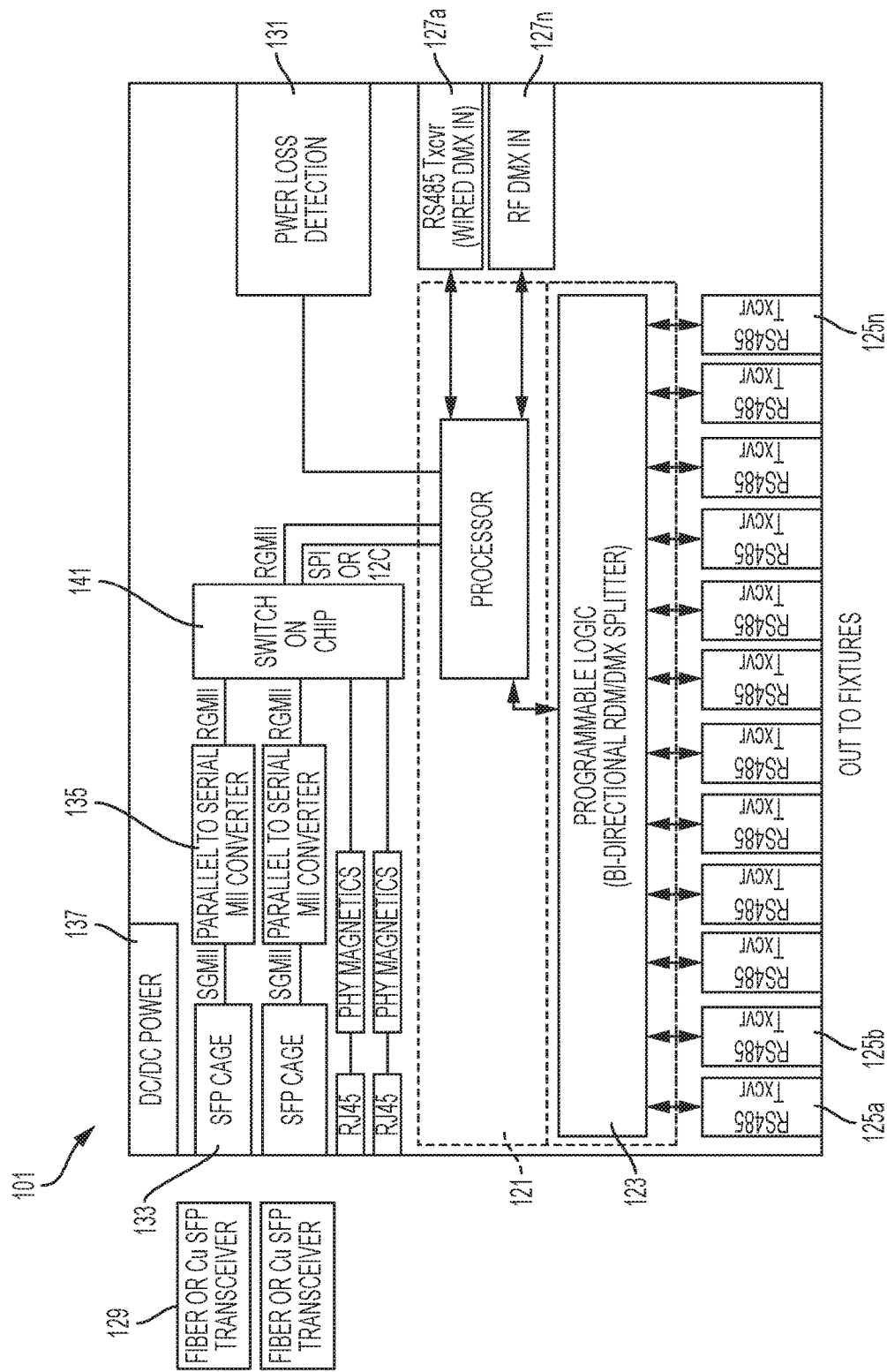
FIG. 8 illustrates various components of a router that may be used in various embodiments of the system described in this document.

FIG. 8 illustrates an example block diagram of a router device 101. The router device is capable of receiving lighting control data and returning telemetry and other data via multiple types of media, and using any of multiple communication protocols, including but not limited to:

Copper 10/100/1000 Ethernet (also known as 1000Base-T or GigE) media
        Streaming Architectural Control Network (sACN or E1.31) protocol
        Art-Net protocol
        Streaming remote device management (RDM) (e.g., E1.33) protocol
    Single mode fiber or multi-mode fiber such as Fiber 100/1000 Ethernet (via SFP-Small Form-factor Pluggable—transceivers to adapt to a variety of single-mode and multi-mode fiber standards)
        Streaming Architectural Control Network (sACN or E1.31) protocol
        Art-Net protocol
        Streaming RDM (e.g., E1.33) protocol
    RS-485
        DMX (i.e., any digital multiplex protocol such as DMX-512A)
        RDM DMX (i.e., DMX enhanced with remote device management, sometimes known as a DMX-RDM one-port gateway)
    Wireless/Radio frequency (RF)
        DMX
        RDM DMX Other media and communication protocols may be used in various embodiments, such as RS422, RS232, RS423, and the like.

Referring to FIG. 8, each router device 101 may include a configurable output so that it can be adapted to the media and communication protocols with which it is used. The router includes a power source 133 such as an internal battery and/or a plug for connecting to an external power supply. The router includes any number of input/output signal transceivers, such as Ethernet and/or fiber optic cable ports 129 that are part of a small form-factor pluggable (SFP) cage 133, a wireless receiver, or other input devices. Each port of the SFP cage may be in communication with a parallel-to-serial media independent interface (MII) converter 135 that converts the signals going in either direction, such as serial gigabit media-independent interface (SGMII) for signals on the SFP cage side of the converter 135 and reduced gigabit media-independent interface (RGMII) on an Ethernet switch 141 side of the converter 135.

The router includes programmable logic and a processing device 121 (such as a microprocessor or field programmable gate array) that can be programmed and used to configure and direct signals via a splitter 123 to each of the output ports 125a . . . 125n independently of the others. Each of the output ports can be configured to output from any universe of incoming DMX, RDM or other data (as the Ethernet protocols all allow multiple DMX universes). Each of the output ports can be configured to begin its output from any point in an incoming DMX data stream (i.e. it can byte-shift the incoming stream to effectively change the address of the light fixtures downstream). The output port configuration can be done via any of the RDM-capable input ports 127a . . . 127n (e.g., Copper or fiber Ethernet, RS-485, or RF). Each of the output ports may be electrically isolated from each other and from each of the input ports.

The router device may have the ability to take an input 131 that indicates that a power outage situation has occurred in the building. The device can respond to this input by outputting predetermined (or other appropriate) DMX levels on each of its outputs.

The device may include a fully functional Ethernet switch 141, and thus may be useful in the routing of both lighting data and generic Ethernet traffic (useful in arenas and stadiums for scoreboards, ribbon lights, fog and pyrotechnic effects, sound, sensor data). The Ethernet switch 141 included may make use of Rapid Spanning Tree Protocol. When multiple routers are configured into a ring topology as shown in FIG. 7, the physical layer of the network can be broken in any one location, and the network is able to heal around this break by re-routing data to the affected nodes secondary inputs.

Figure 9:
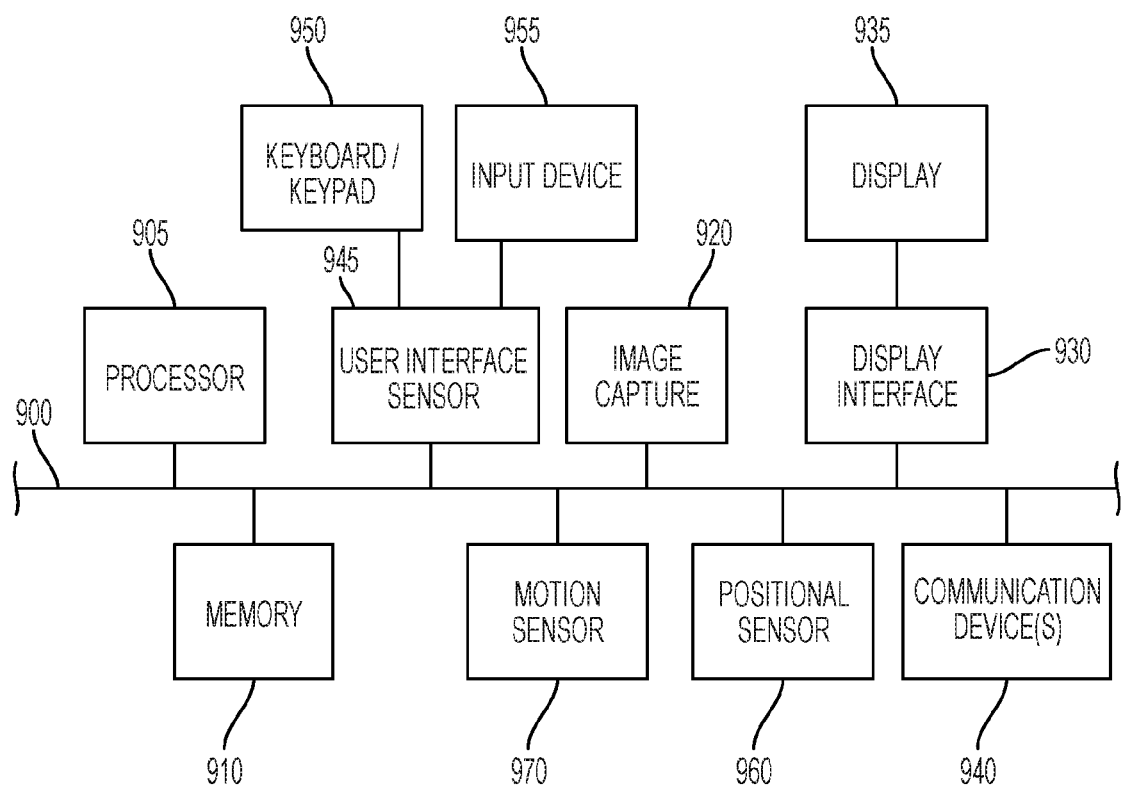
FIG. 9 illustrates various hardware components that may be included in one or more electronic devices.

FIG. 9 depicts a block diagram of hardware that may be including in any of the electronic devices described above, such as an electronic device or controller device. A bus 900 serves as an information highway interconnecting the other illustrated components of the hardware. The bus may be a physical connection between elements of the system, or a wired or wireless communication system via which various elements of the system share data. Processor 905 is a processing device of the system performing calculations and logic operations required to execute a program. Processor 905, alone or in conjunction with one or more of the other elements disclosed in FIG. 9, is an example of a processing device, computing device or processor as such terms are used within this disclosure. The processing device may be a physical processing device, a virtual device contained within another processing device, or a container included within a processing device.

A memory device 910 is a hardware element or segment of a hardware element on which programming instructions, data, or both may be stored. Read only memory (ROM) and random access memory (RAM) constitute examples of memory devices, along with cloud storage services.

An optional display interface 930 may permit information to be displayed on the display 835 in audio, visual, graphic or alphanumeric format. Communication with external devices, such as a printing device, may occur using various communication devices 940, such as a communication port or antenna. A communication device 940 may be communicatively connected to a communication network, such as the Internet or an intranet.

The hardware may also include a user input interface 945 which allows for receipt of data from input devices such as a keyboard or keypad 950, or other input device 955 such as a mouse, a touchpad, a touch screen, a remote control, a pointing device, a video input device and/or a microphone. Data also may be received from an image capturing device 920 such as a digital camera or video camera. A positional sensor 960 and/or motion sensor 970 may be included to detect position and movement of the device. Examples of motion sensors 970 include gyroscopes or accelerometers. Examples of positional sensors 960 such as a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system of lighting devices, the system comprising:
   a central controller comprising:
      a processor,
      a first communication interface comprising a plurality of input ports, and a multiplexer configured to receive signals from the plurality of input ports and combine the received signals into a multiplexed signal, and
      a second communication interface comprising one or more antennas, wherein the second communication interface is configured to receive the multiplexed signal from the multiplexer and transmit the multiplexed signal via the one or more antennas;
   a plurality of lighting devices, each of which comprises a fixture controller, one or more lighting modules, and a communication interface; and
   a communication link for transmitting the multiplexed signal between one or more of the lighting devices and at least one of the communication interfaces of the central controller.

2. The system of claim 1, wherein the communication link comprises a plurality of serial communication links, each of which connects a communication interface of one of the lighting devices to either a communication interface of another one of the lighting devices, or to one of the communication interfaces of the central controller, to provide for transfer of the multiplexed signal between the lighting devices and the central controller.

3. The system of claim 1, wherein at least one of the lighting devices also comprises a memory that contains programming instructions that are configured to cause the fixture controller of that lighting device to:
   upon receipt of the multiplexed signal from the central controller, examine the multiplexed signal to identify one or more destination lighting devices to which a command in the multiplexed signal was directed; and
   if the identified one or more destination devices include the lighting device of which the fixture controller is a component, cause the lighting module of the lighting device of which the fixture controller is a component to take an action according to the command.

4. The system of claim 1, wherein:
   the second communication interface comprises a plurality of antennas; and
   the central controller further comprises a switch for selectively directing the multiplexed signal from the multiplexer to one of the antennas.

5. The system of claim 1, wherein:
   the communication link is communicatively connected to the second communication interface of the central controller to send commands from the central controller to the lighting devices; and
   the first communication interface of the central controller is communicatively connected to one or more remote controllers.

6. The system of claim 1, wherein:
   the communication link is communicatively connected to the first communication interface of the central controller so that the central controller receives data from the lighting devices; and
   the second communication interface of the central controller is communicatively connected to one or more remote systems.

7. The system of claim 1, wherein the central controller further comprises a memory device that stores programming instructions that are configured to, for any received signal that is encoded according to a first communication protocol that is not compatible with a communication protocol of the lighting devices:
   translate a command in the signal from the first communication protocol into a second communication protocol that is compatible with the communication protocol of the lighting devices; and
   cause the translated command to be transmitted to one or more of the lighting devices.

8. The system of claim 1, wherein:
   the central controller and the lighting devices are communicatively connected in a ring topology;
   each of the lighting devices comprises or is communicatively connected to a router; and the central controller is configured to, upon detecting a failure in a lighting device or communication link of the ring topology, identify a location of the failure and direct future commands to selected lighting devices in the system via the routers.

9. A lighting system, comprising
a plurality of lighting devices; and
a central controller that is communicatively connected to the lighting devices, wherein the central controller comprises:
 a processor,
 a first communication interface, and
 a memory device containing programming instructions that are configured to cause the processor to:
  receive one or more command signals via the first communication interface, wherein the one or more command signals comprise a command that is directed for one or more of the lighting devices, and the command is encoded according to a first communication protocol that is not compatible with the one or more lighting devices for which the command is directed;
  translate the command from the first communication protocol into a second communication protocol that is compatible with the one or more lighting devices for which the command is directed; and
  cause the translated command to be transmitted to the one or more lighting devices for which the command is directed so that the one or more lighting devices for which the command is directed will actuate in accordance with the command.

10. The lighting system of claim 9, wherein the first communication interface comprises:
 a plurality of input ports for receiving a plurality of command signals; and
 a multiplexer that is configured to receive the command signals from the input ports and combine the command signals into a multiplexed signal.

11. The lighting system of claim 10, wherein the controller also comprises a second communication interface comprising one or more one or more antennas configured to receive the multiplexed signal and transmit the multiplexed signal to the one or more lighting devices via the one or more antennas.

12. The lighting system of claim 11, wherein the controller further comprises a switch for selectively directing the multiplexed signal from the multiplexer to one of the antennas.

13. The lighting system of claim 9, wherein at least one of the lighting devices comprises:
 a fixture controller;
 one or more lighting modules;
 a communication interface; and
 a memory that contains programming instructions that are configured to cause the fixture controller to:
  upon receipt of a translated command from the controller device, examine the command to identify one or more destination lighting devices to which the command was directed, and
  if the identified one or more destination devices include the lighting device of which the fixture controller is a component, cause the lighting module of the lighting device of which the fixture controller is a component to take an action according to the command.

14. The lighting system of claim 9, wherein the central controller and the lighting devices are communicatively connected in a ring topology, and each of the lighting devices comprises or is communicatively connected to a router.

15. The lighting system of claim 14, wherein the central controller is configured to, upon detection of a failure in a lighting device or communication link of the ring topology:
 identify a location of the failure; and
 direct future commands to selected lighting devices in the system via the routers.

16. A method of controlling a system of lighting devices, comprising
 by a central controller that is communicatively connected to a plurality of lighting devices:
  receiving one or more command signals via a first communication interface, wherein the one or more command signals comprise a command that is directed for one or more of the lighting devices, and the command is encoded according to a first communication protocol that is not compatible with the one or more lighting devices for which the command is directed;
  translating the command from the first communication protocol into a second communication protocol that is compatible with the one or more lighting devices for which the command is directed; and
  causing the translated command to be transmitted to the one or more lighting devices for which the command is directed so that the one or more lighting devices for which the command is directed will actuate in accordance with the command.

17. The method of claim 16, wherein:
the one or more command signals comprise a plurality of command signals; and
the method further comprises, by the central controller, combining the plurality of command signals into a multiplexed signal before causing the translated command to be transmitted to the one or more lighting devices for which the command is directed..

18. The method of claim 16, wherein:
at least one of the lighting devices comprises a fixture controller, one or more lighting modules, and a second communication interface; and
the method further comprises, by the fixture controller of at least one of the lighting devices:
 upon receipt of a translated command from the central controller, examining the translated command to identify one or more destination lighting devices to which the translated command was directed; and
 if the identified one or more destination devices include the lighting device of which the fixture controller is a component, causing the lighting module of the lighting device to take an action according to the command;
 if the identified one or more destination devices do not include the lighting device of which the fixture controller is a component, ignoring the command or passing the command on to one or more other of the lighting devices.

* * * * *